United States Patent
Johnson et al.

(10) Patent No.: US 9,808,021 B2
(45) Date of Patent: Nov. 7, 2017

(54) SYSTEMS AND METHODS FOR OZONE TREATMENT OF GRAIN IN GRAIN PILES

(75) Inventors: Kevin C. Johnson, Pocatello, ID (US); Lynn Johnson, American Falls, ID (US); Delron E. Albert, Aberdeer, ID (US); Vane Case, Blackloot, ID (US)

(73) Assignee: Archer Daniels Midland Co., Decatur, IL (US)

( * ) Notice: Subject to any disclaimer, the term of this patent is extended or adjusted under 35 U.S.C. 154(b) by 985 days.

(21) Appl. No.: 12/716,301

(22) Filed: Mar. 3, 2010

(65) Prior Publication Data
US 2011/0151073 A1 Jun. 23, 2011

Related U.S. Application Data

(63) Continuation-in-part of application No. 12/645,279, filed on Dec. 22, 2009.

(51) Int. Cl.
*A23B 9/30* (2006.01)
*A23B 9/18* (2006.01)

(52) U.S. Cl.
CPC ............... *A23B 9/30* (2013.01); *A23B 9/18* (2013.01); *A23V 2002/00* (2013.01)

(58) Field of Classification Search
CPC ........ A23B 9/18; A23B 9/30; A23V 2200/10; A23V 2250/128
USPC ................................................. 426/320, 231
See application file for complete search history.

(56) References Cited

U.S. PATENT DOCUMENTS

| | | |
|---|---|---|
| 1,220,160 A | 3/1917 | Moore |
| 1,267,204 A | 5/1918 | Frick |
| 3,918,404 A | 11/1975 | Bunger |
| 4,454,807 A | 6/1984 | Wolstenholme |
| 4,549,477 A | 10/1985 | McCabe, Jr. |
| 4,726,286 A | 2/1988 | Anderson |
| 4,795,651 A | 1/1989 | Henderson et al. |

(Continued)

FOREIGN PATENT DOCUMENTS

| | | | |
|---|---|---|---|
| JP | 4200749 | 7/1992 | |
| RU | 2315460 C1 * | 1/2008 | |
| WO | WO 02074349 A1 * | 9/2002 | ........... A23L 3/3409 |

OTHER PUBLICATIONS

Maier et al. "Modeling airflow in outdoor grain pile aeration systems". Oct. 2006, pp. 1166-1173.*

(Continued)

*Primary Examiner* — D. Lawrence Tarazano
*Assistant Examiner* — Stephanie Cox
(74) *Attorney, Agent, or Firm* — Andrew F. Nilles (57) ABSTRACT

Systems and methods for treating grain stored in a grain pile with ozone are effective for treating grain for toxins, insects, mold, and/or odor. A method according to embodiments of the invention involves monitoring at least one of temperature and odor at a plurality of aeration outlet locations spaced around the grain pile. When an abnormal temperature variance or odor is detected at one or more of the aeration outlet locations, a determination is made as to a problem location within the grain pile where a treatment of ozone should be applied, and a further determination is made as to how best to apply ozone to the problem location. Ozone is then applied to the problem location within the grain pile to minimize nascent problems in the grain pile. The ozone treatment may reduce molds and toxins.

16 Claims, 6 Drawing Sheets

(56) References Cited

U.S. PATENT DOCUMENTS

| | | |
|---|---|---|
| 4,884,700 A | 12/1989 | Carroll |
| 4,954,321 A | 9/1990 | Jensen |
| 5,263,896 A | 11/1993 | Carroll |
| 5,326,543 A | 7/1994 | Fiorenzano, Jr. |
| 5,403,441 A | 4/1995 | McDonald |
| 5,700,505 A | 12/1997 | Hurst |
| 6,387,241 B1 | 5/2002 | Murphy et al. |
| 7,138,145 B2 | 11/2006 | Walker |
| 7,351,373 B2 | 4/2008 | Reid et al. |
| 2007/0134380 A1* | 6/2007 | Vetter et al. ............ 426/320 |
| 2009/0094853 A1 | 4/2009 | Noyes et al. |
| 2009/0117016 A1 | 5/2009 | Decker et al. |
| 2009/0191091 A1 | 7/2009 | Danchenko et al. |

OTHER PUBLICATIONS

Wilcke, Bill. "Using Flat Buildings for Dry Grain Storage". 1999, pp. 1-2.*

Mendez et al. "Penetration of ozone into columns of stored grains and effects on chemical composition and processing performance". 2003, pp. 34-44.*

English Translation of RU2315460.*

English Translation of RU2309568.*

Kells, Steven A., Efficacy and Fumigation Characteristics of Ozone in Stored Maize, Journal of Stored Product Research, Sep. 2000, vol. 37, pp. 371-382.

Herrman, Timothy J., Integrated Pest Management in Grain Storage and Feed Mills, ASA Technical Bulletin, vol. FT47, 1998.

Sopher, Charles D., Studies on the Use of Ozone in Production Agriculture and Food Processing, International Ozone Association, 2002.

Mason, L.J., Ozone: A New Control Strategy for Stored Grain, PS7-33-6314.

Maier, Food Grains Ozonation—A New Stored Product IPM Pest Control Technology, Purdue University.

Maier, D., Modeling Airflow in Outdoor Grain Pile Aeration Systems, PS10-7-6159.

Maier, D.E., Ozonation as a Non-Chemical Stored Product Protection Technology, PS7-14-6162.

Hipolito de Sousa, Adalberto, Ozone as Alternative to Manage Phosphine-Resistant Populations of Rhyzopertha Dominica, IOA Conference and Exhibition Valencia, Spain, Oct. 2007.

* cited by examiner

SYSTEMS AND METHODS FOR OZONE TREATMENT OF GRAIN IN GRAIN PILES

CROSS-REFERENCE TO RELATED APPLICATIONS

This application is a continuation-in-part of prior application Ser. No. 12/645,279, filed Dec. 22, 2009, which is incorporated herein in its entirety by reference.

BACKGROUND OF THE INVENTION

1. Field of the Invention

The present invention relates to grain treatment, and more particularly to systems and methods for treating grain in grain piles with ozone.

2. Background and Related Art

Many types of grain are grown for human and animal consumption and use. The condition of the grain is often affected by the growing conditions, and when the grain is harvested, it may be found to contain insects, mold and/or bacteria, unwanted odors, and/or toxins remaining from the presence of molds and the like. Additionally, once grain has been harvested, it often is stored for some time prior to final distribution and use. During times of storage, existing problems with the grain can be exacerbated. Depending on the extent and severity of the odor, mold, or toxin problems, the value of the grain can be slightly to greatly reduced.

Several forms of mycotoxins can be found in harvested and/or stored grain, including vomitoxin, aflatoxin, and fumonisin. These toxins are residues left behind by molds that may no longer be present in the grain. Certain conditions during certain periods of the grain growth cycles encourage mold growths, and the toxins are the after-products of that growth. It is essentially impossible to spray or treat the growing grain in such a way as to treat or prevent the mold outbreaks. Therefore, farmers generally have to hope for favorable growing conditions that do not encourage mold proliferation.

In Europe, statutory levels of a range of mycotoxins permitted in food and animal feed are set by a range of European directives and Commission regulations. The U.S. Food and Drug Administration has regulated and enforced limits on concentrations of mycotoxins in foods and feed industries since 1985. Vomitoxin is a common problem in smaller grains such as wheat and barley. Aflatoxin is affects the marketability of corn and peanuts. Fumonisin is problematic in corn crops.

Deterioration in the quality of stored grain by insects, molds and mycotoxins causes economic losses to farmers, elevators managers and processors throughout the world. Insect development in stored grains is a function of time, grain moisture content and grain temperature. The current trend is toward a reduction in the dependence on chemicals. Aeration is one non-chemical alternative to reduce insect problems. The use of aeration contributes towards a safer environment by reducing the chemical residues in the food and feed supply chains, but is still limited in its ability to adequately address grain storage needs, especially in large grain piles.

Elevator operators regularly pile grain outdoors for a few weeks or months when receipts at harvest temporarily exceed storage capacity and when transportation is not available to move the grain ahead in the marketing chain. Usually outdoor piles store grain for periods not exceeding 6 months before grain is moved or marketed. To maintain grain quality, it should be placed in the pile with a temperature below 15.5° C. and safe storage moisture content of 15% or less. Sufficiently-dry corn stored in piles during only the cooler fall and winter weather may not need to be covered and aerated; however, when grain is stored into the following spring and summer, tarp covers are commonly used and provisions need to be made for aeration.

If the grain must be piled outside on the ground, drainage is crucial. The pile should be on high ground and the earth crowned under the pile. A vapor barrier (for example 6-mil plastic) is typically placed on the ground to keep ground moisture from wetting the grain unless the pile is on well-drained gravel-covered soil.

Grain depth in an outdoor pile frequently runs from near zero at the edge of the pile to a maximum at the center. A circular pile that will hold one million bushels may be slightly less than 300 feet in diameter with a circumference of over 900 feet. An oblong pile may be 120 to 180 feet wide and 300 to 700 feet long, holding one-half to one and one-half million bushels. Often some type of low retainer wall is used around the circumference, such as concrete traffic dividers or barriers. The weight of the concrete is such that the barriers are stable and support the lateral pressure of the grain up to depths of 3-4 feet. With a 5 foot grain wall depth, there is a force of about 115 pounds of force on each foot pushing outward.

Plastic or tarp covering a pile reduces wetting by rain and snow but may turn out to be an expensive, frustrating and labor-intensive undertaking. The top surface should be smooth to aid in drainage. The cover is placed to carry water away from the piled grain to prevent wetting the grain. Condensation under the plastic may cause severe problems unless it is properly controlled with aeration. Airflow underneath and near the cover reduces the condensation and carries the moisture away. Commonly, multiple aeration fans exhaust air from the bottom of the pile. Sucking air with the fans through the pile and out of the bottom also aids in holding the tarp, plastic, or other covering down in windy situations.

The problem of getting adequate distribution of aeration air to grain in a large pile is obvious. For example, a circle at 30 feet in from the edge of the circular one million bushel pile described above has a circumference of approximately 750 feet. The general recommendation on duct spacing is that ducts should be spaced no farther apart than the grain is deep, 15 feet in this example. Thus, 48 ducts and fans would be required for this pile. Without a cover, the air entrance area for a suction aeration system is the entire grain surface. One problem in aerating tarp-covered piles is caused by the tarp. The tarp is held in place through suction created by the aeration fans; however, if the tarp is held too tightly against the grain surface, no air will enter the grain pile, and aeration will be minimized. If a center tower is employed to fill the storage, aeration ducts and/or exhaust fans can be part of the center structure. The aeration air may be drawn in through a perforated retainer wall and exhausted out of the center tower, or vice-versa.

Aeration requires a mechanical ventilation system that can be used to manage grain temperatures by moving air with the desired properties through the grain mass preventing moisture movement and accumulation therefore maximizing grain storage life. In North America, numerous aeration system designs exit to aerate large outdoor grain piles. The main purpose of aeration is to cool grain by moving air through the grain mass by suction (negative pressure) or by pushing (positive pressure). In order to achieve cooling as uniformly and quickly as possible, an aeration system design must provide as uniform of an air distribution through the grain mass as possible. The most common aeration method in outdoor grain piles is by suction airflow in order to hold in place the tarps or other covering of the piles.

Even with the best aeration systems, however, problems still develop in the grain piles, and the value of some or all of the grain may be significantly reduced. Such problems develop and worsen over time. The full extent of the problems is often not discovered until the time of removing the grain from the piles for marketing and distribution. The scope of such problems can be understood by recognizing that a problem that causes a ten-cent-per-bushel average reduction in the value of the grain stored in a one million bushel pile equates to an economic loss of $100,000.00 dollars.

BRIEF SUMMARY OF THE INVENTION

Implementation of the invention provides systems and methods for treating grain stored in a grain pile with ozone. Treatment of grain with ozone according to implementations of the invention may be effective for treating grain for toxins, insects, mold, and/or odor. A method according to implementations of the invention involves monitoring temperature and/or odor at a plurality of aeration outlet locations spaced around the grain pile. When an abnormal temperature variance or abnormal odor is detected at one or more of the aeration outlet locations, a determination is made as to a problem location within the grain pile where a treatment of ozone should be applied, and a further determination is made as to how best to apply ozone to the problem location. Ozone is then applied to the problem location within the grain pile to minimize nascent problems in the grain pile. The ozone treatment may reduce molds and toxins.

The determination of a problem location may involve generating a model of air flow through the grain pile, which is used using information from the model of air flow and the location or locations where the abnormal temperature variance or abnormal odor is detected to determine a position estimate of the problem location. The determination of how best to apply ozone to the problem location may involve determining available ozone insertion mechanisms and locations and determining which ozone insertion mechanisms and locations will best ensure an effective amount of ozone is delivered to the problem location.

Depending on the position of the problem location, the estimated size of the problem location, the available ozone insertion mechanisms and locations, and any of a variety of similar or other factors, applying ozone to the problem location may involve one or more of a variety of ozone application systems and methods. As one example, a direction of flow of air at one of the aeration outlet locations is reversed, and ozone is taken up into the grain at the aeration outlet location having reversed flow. As another example, an access hole is created in a covering of the grain pile proximate the problem location and ozone is supplied to the problem location through the access hole at very high concentrations, such as through an ozone supply tube inserted into the grain through the access hole. As a third example, ozone is supplied to the grain pile through an aeration supply vent, such as a supply vent located on top of the grain pile or a hose-type supply vent supplied on top of the grain pile under the covering.

In some instances, depending to some extent on the scope and location of the detected problem, ozone is applied to the problem area for a set time calculated to address any causes of the detected temperature variance or odor. In other instances, ozone is applied to the problem area until ozone is detected leaving the grain pile at one or more of the aeration outlet locations where the temperature variance or odor was detected.

Another method of treating grain stored in a grain pile according to implementation of the invention involves monitoring air output at a plurality of aeration outlet locations spaced around the grain pile for temperature increases and/or abnormal odors. When an undesired temperature increase or odor is detected at one or more of the aeration outlet locations, a determination is made of a problem location within the grain pile where a treatment of ozone should be applied based on each location of detected temperature increase or abnormal odor and on a magnitude at each location of detected temperature increase or odor. Then, how best to apply ozone to the problem location so that the ozone reaches the problem location is determined, and ozone is applied to the problem location within the grain pile to minimize nascent problems in the grain pile without substantially disturbing the grain pile.

The determination of how best to apply ozone to the problem location may involve a variety of factors, including an estimate of a size of the problem location, whether the application of ozone at an existing grain pile access point will allow the ozone to adequately reach the problem location, and whether to apply highly-concentrated ozone by creating an access hole in a covering of the grain pile.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide systems and methods for treating grain stored in a grain pile with ozone. Treatment of grain with ozone according to embodiments of the invention may be effective for treating grain for toxins, insects, mold, and/or odor. A method according to embodiments of the invention involves monitoring temperature and/or odor at a plurality of aeration outlet locations spaced around the grain pile. When an abnormal temperature variance or abnormal odor is detected at one or more of the aeration outlet locations, a determination is made as to a problem location within the grain pile where a treatment of ozone should be applied, and a further determination is made as to how best to apply ozone to the problem location. Ozone is then applied to the problem location within the grain pile to minimize nascent problems in the grain pile. The ozone treatment may reduce molds and toxins.

The determination of a problem location may involve generating a model of air flow through the grain pile, which is used using information from the model of air flow and the location or locations where the abnormal temperature variance or odor is detected to determine a position estimate of the problem location. The determination of how best to apply ozone to the problem location may involve determining available ozone insertion mechanisms and locations and determining which ozone insertion mechanisms and locations will best ensure an effective amount of ozone is delivered to the problem location.

Depending on the position of the problem location, the estimated size of the problem location, the available ozone insertion mechanisms and locations, and any of a variety of similar or other factors, applying ozone to the problem location may involve one or more of a variety of ozone application systems and methods. As one example, a direction of flow of air at one of the aeration outlet locations is reversed, and ozone is taken up into the grain at the location of reversed flow. As another example, an access hole is created in a covering of the grain pile proximate the problem location and ozone is supplied to the problem location through the access hole at very high concentrations, such as through an ozone supply tube inserted into the grain through the access hole. As a third example, ozone is supplied to the grain pile through an aeration supply vent, such as a supply vent located on top of the grain pile or a hose-type supply vent supplied on top of the grain pile under the covering.

In some instances, depending to some extent on the scope and location of the detected problem, ozone is applied to the problem area for a set time calculated to address any causes of the detected temperature variance or odor. In other instances, ozone is applied to the problem area until ozone is detected leaving the grain pile at one or more of the aeration outlet locations where the temperature variance or odor was detected.

Another method of treating grain stored in a grain pile according to embodiments of the invention involves monitoring air output at a plurality of aeration outlet locations spaced around the grain pile for temperature increases and/or abnormal odors. When an undesired temperature increase or odor is detected at one or more of the aeration outlet locations, a determination is made of a problem location within the grain pile where a treatment of ozone should be applied based on each location of detected temperature increase or odor and on a magnitude at each location of detected temperature increase or odor. Then, how best to apply ozone to the problem location so that the ozone reaches the problem location is determined, and ozone is applied to the problem location within the grain pile to minimize nascent problems in the grain pile without substantially disturbing the grain pile.

The determination of how best to apply ozone to the problem location may involve a variety of factors, including an estimate of a size of the problem location, whether the application of ozone at an existing grain pile access point will allow the ozone to adequately reach the problem location, and whether to apply highly-concentrated ozone by creating an access hole in a covering of the grain pile.

Figure 1:
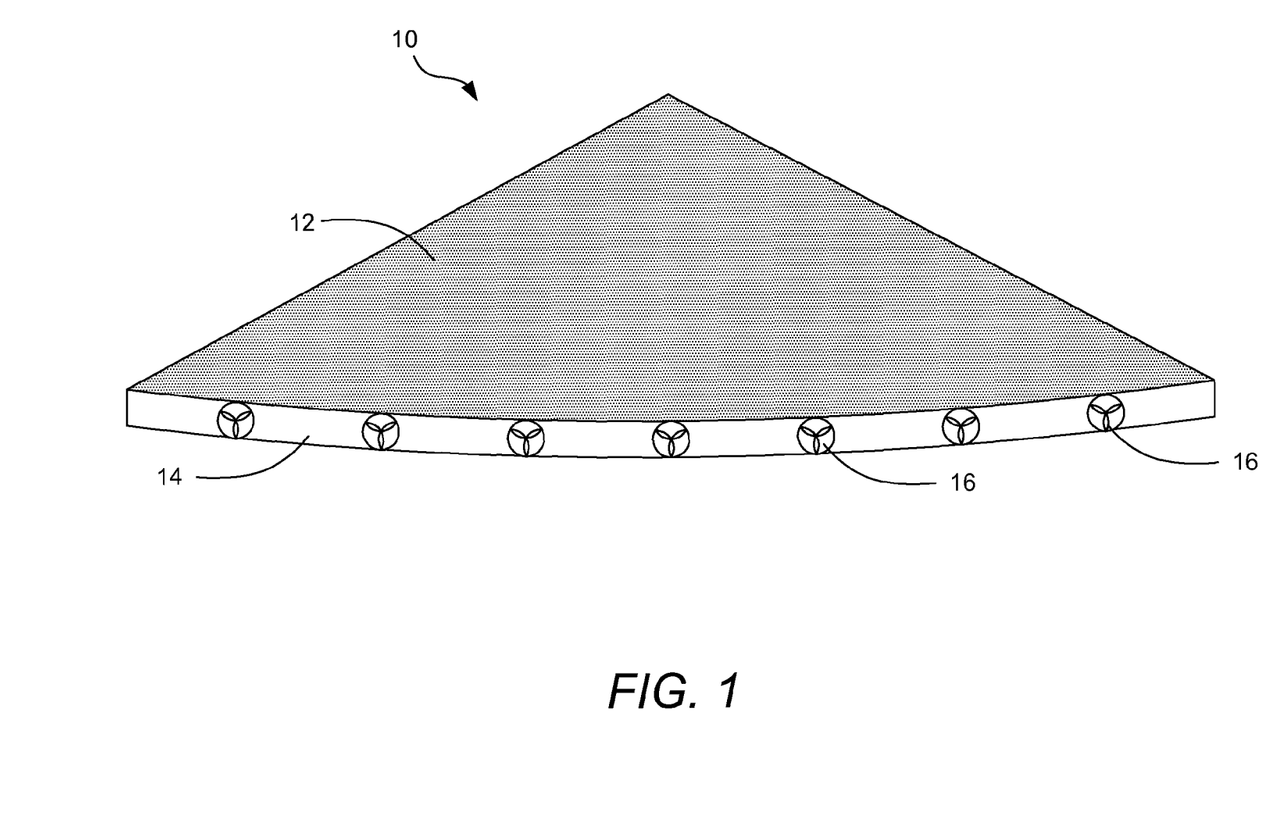
FIGS. 1-4 show representative depictions of a grain pile and features of embodiments of the invention.

FIG. 1 shows a perspective view of a representative grain pile 10 similar to those currently used. The grain pile 10 in the illustrated example is approximately circular, but grain piles 10 similar to that illustrated may be elongate in one or more directions as desired or needed. The grain pile 10 in the current example is formed from a large quantity of grain 12 (e.g. wheat, corn, etc.) that is optionally enclosed by a retaining structure 14. The retaining structure 14 allows a larger quantity of the grain 12 to be stored over a smaller footprint. As different grains permit the slope angle of the sides of the grain pile 10 to vary, the slope illustrated in FIG. 1 (and all the Figures) is intended only to illustrate the general features of a representative grain pile 10 for discussion purposes, and is not limiting. Similarly, the features illustrated in the Figures are represented so as to be understood, and are not necessarily to scale with respect to one another.

The retaining structure 14 is provided with a plurality of aeration outlet locations 16. Each aeration outlet location 16 provides a location where air is either allowed to enter or leave the grain pile 10 or where air can be forced into or out of the grain pile 10. In a common configuration, a fan such as an outlet fan is provided at each aeration outlet location 16 and is used to draw air from the grain pile 10. As discussed above, the number and placement of aeration outlet locations 16 varies greatly with the size and configuration of the grain pile 10, and the illustrated configuration and placement is provided merely by way of example and illustration.

Figure 2:
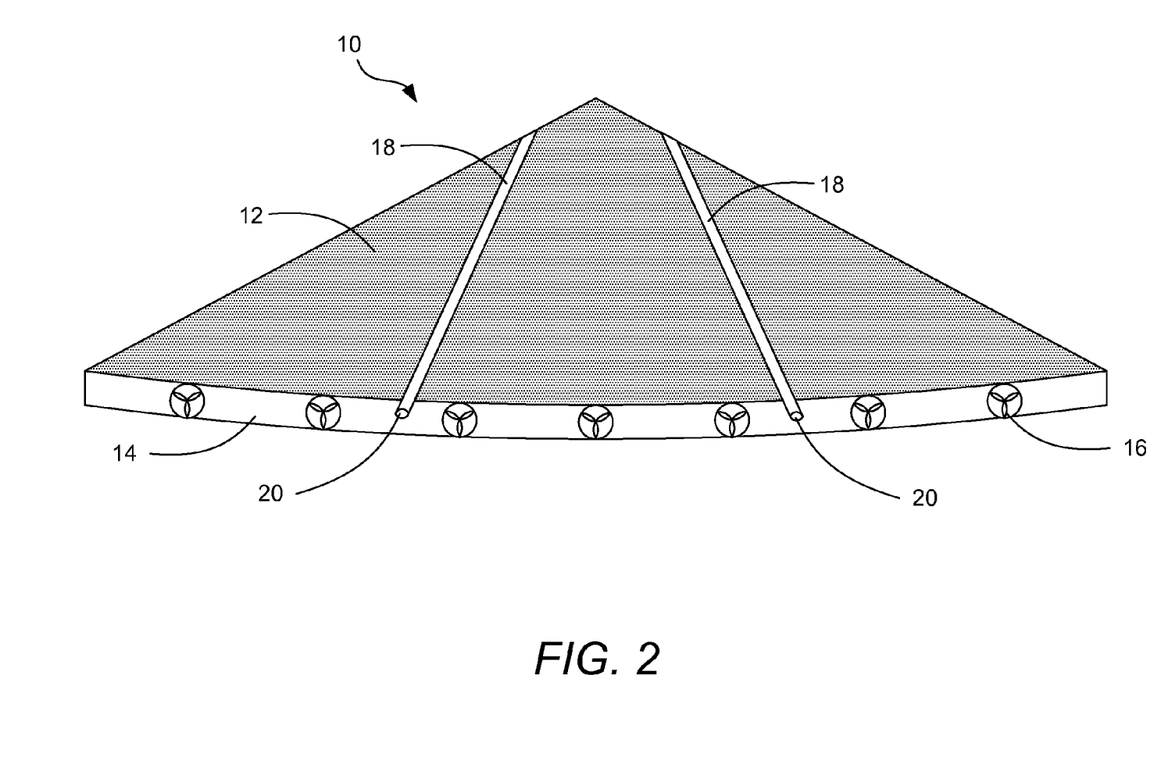

While the aeration outlet locations can also be considered potential inlet locations whereby air (or air mixed with ozone) can be delivered to the grain pile 10, there are several other ways in which air can be delivered to the grain pile 10. FIG. 2 illustrates one manner in which air or air mixed with ozone can be delivered to the grain pile. FIG. 2 shows a pair of elongate aeration supply vents 18. The aeration supply vents 18 in the illustrated example are ventilated tubes with open ends 20 located outside the grain pile 10. The aeration supply vents 18 may be placed on top of the grain pile 10, or may be more or less buried within the grain pile 10. When a negative pressure is supplied to the grain pile 10, such as by fans at the aeration outlet locations 16, the negative pressure causes air to be drawn through the open ends 20 of the aeration supply vents 18, and into the grain pile 10 at one or more locations along the length of the tubes. There may be any number of such aeration supply vents 18 and the tubes of the aeration supply vents 18 may be placed at any desired location and path over/through the grain 12.

Figure 3:
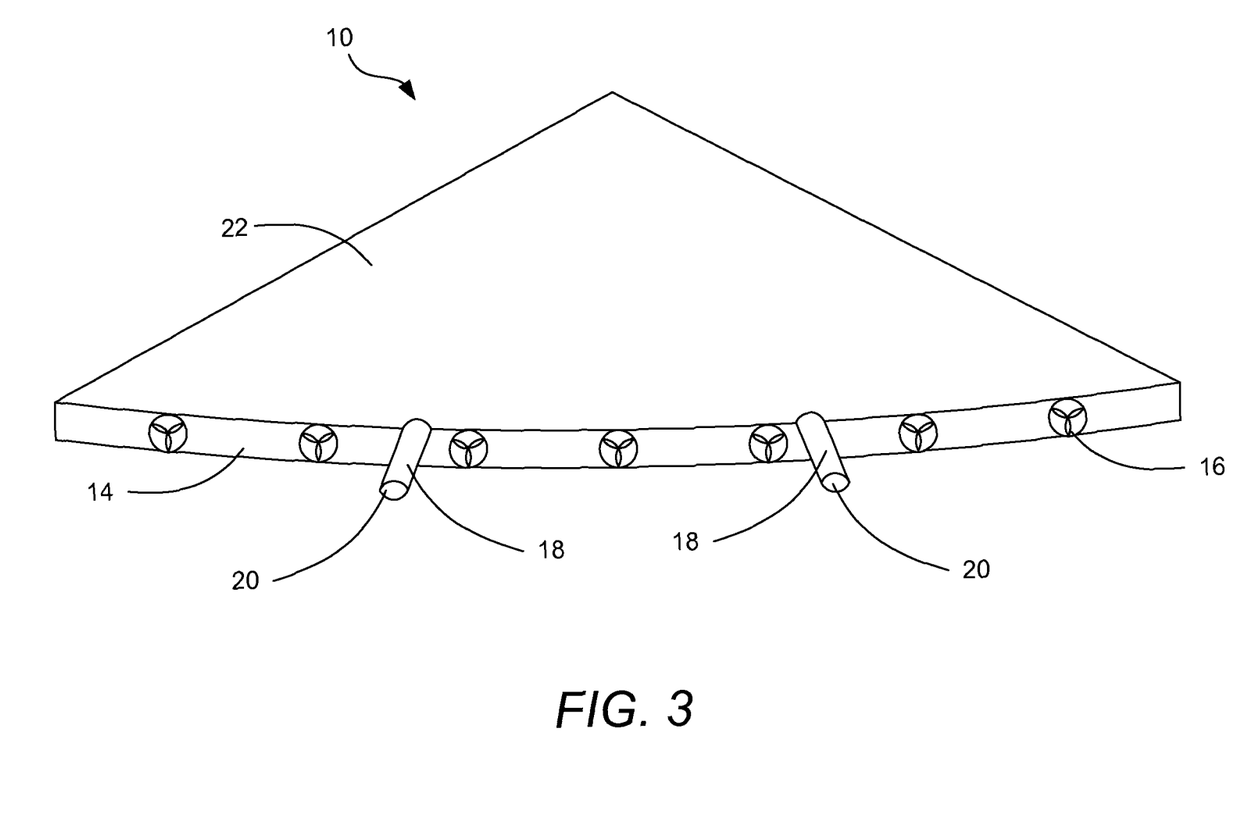

Once the grain 12 has been placed in the grain pile 10 and any aeration supply vents 18 and aeration outlet locations 16 prepared, the grain pile 10 is commonly covered by a covering 22 as shown in FIG. 3. The covering 22 may be any type of covering known for grain piles, such as tarps, plastic, and the like. The covering 22 may be held in place by suction provided by one or more fans, such as at the aeration outlet locations 16. Aeration of the illustrated grain pile 10 when covered by the covering 22 is provided in the illustrated example by the aeration supply vents 18 and the aeration outlet locations 16.

Figure 4:
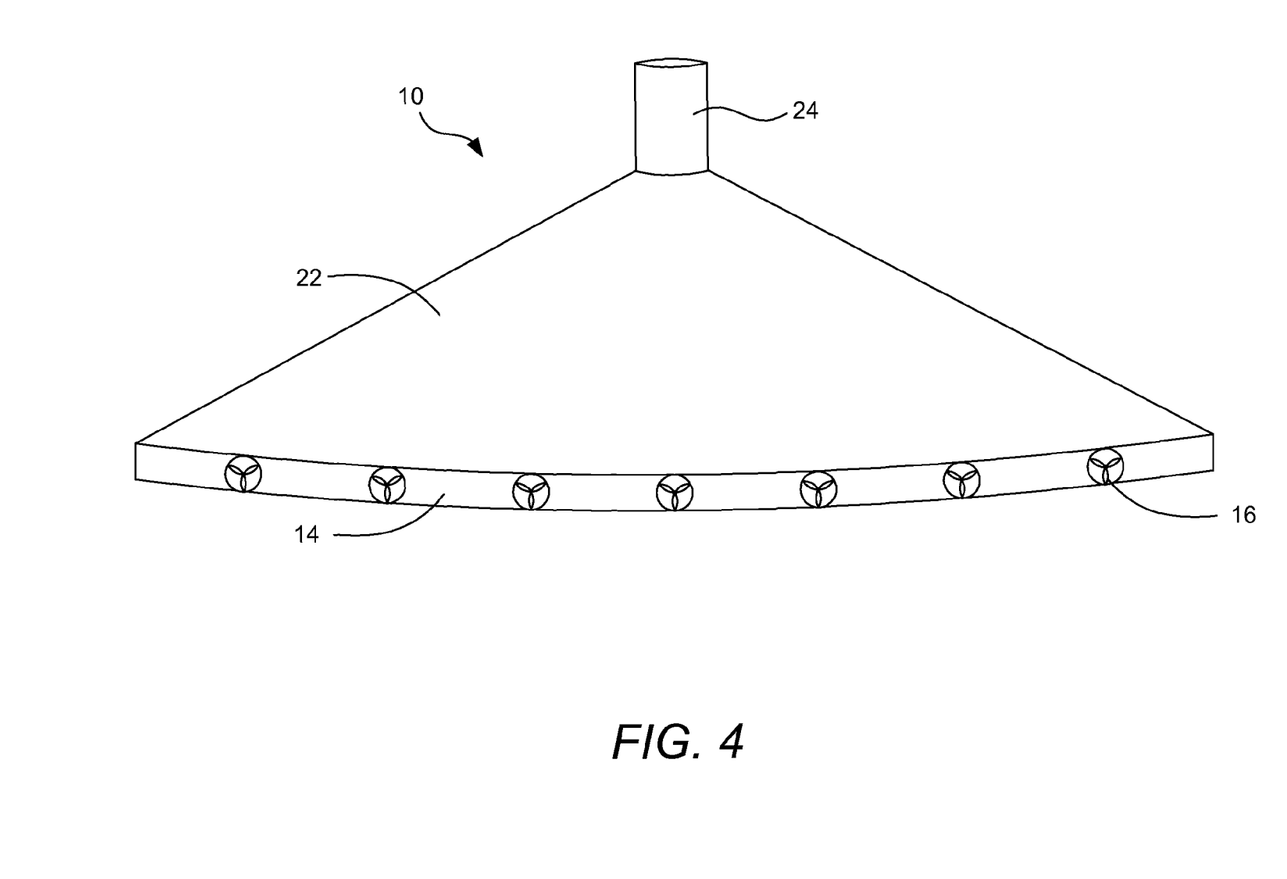

Another illustrative grain pile aeration system is shown in FIG. 4. In this example, a center tower 24 is provided. The center tower 24 may be used for filling the grain pile 10 and then may remain in place to serve as an alternative form of the aeration supply vent 18 or to serve as a location for the open end 20 of one or more of the aeration supply vents 18.

Regardless of the form and shape of the grain pile 10, the number and placement of the aeration outlet locations 16, the total air flow at each aeration outlet location 16, and the presence and form of the aeration supply vents 18, it is generally possible to generate a model of the air flow through the grain pile 10 during aeration of the grain pile. The model of the air flow may vary between a rough estimate of the airflow based on an operator's experience to a detailed and highly-accurate model generated by a computer program or the like. In any event, the model of the air flow can be used to understand how nascent problems detected in the grain pile 10 can be effectively treated with ozone in accordance with embodiments of the invention.

Figure 5:
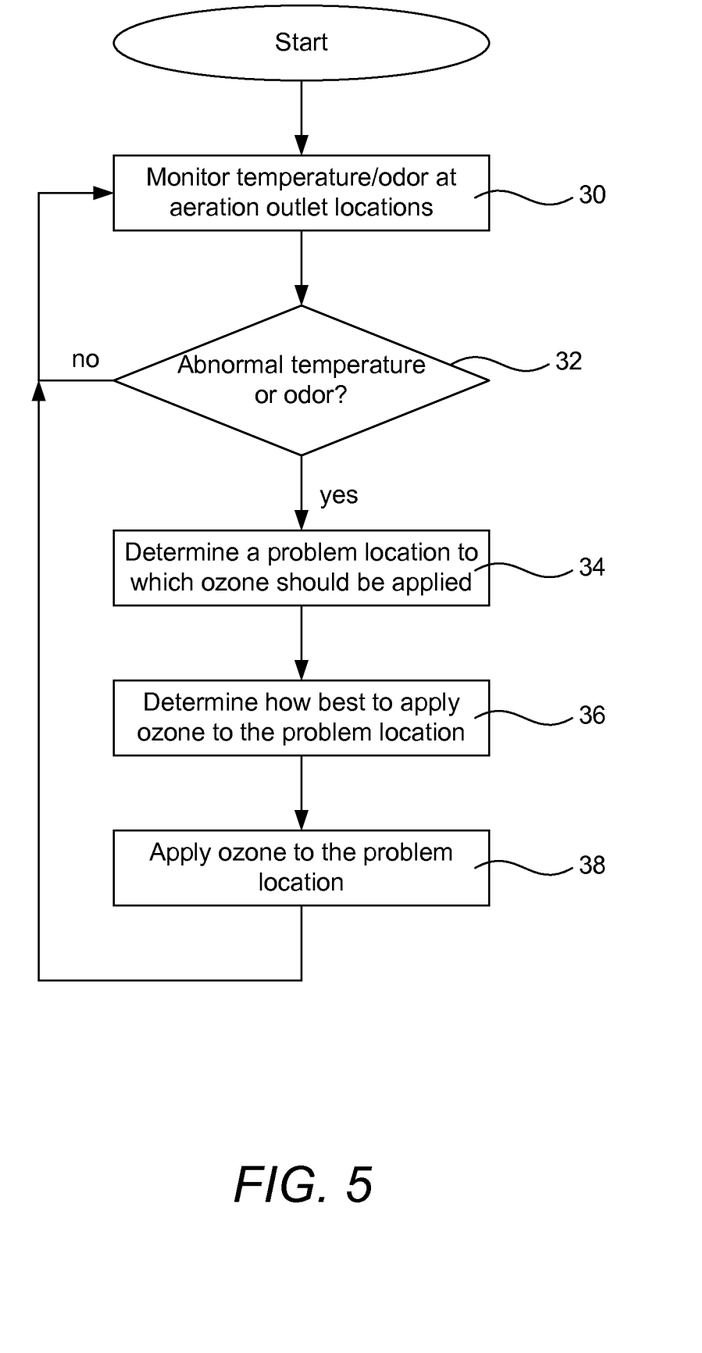
FIG. 5 shows a flow chart of a process according to embodiments of the invention.

FIG. 5 shows a flow chart representing a method of treating grain in a grain pile such as the representative grain piles 10 illustrated in FIGS. 1-4. Execution begins at step 30, where a plurality of aeration outlet locations 16 is monitored for temperature and odor. As discussed above, the monitoring may occur at aeration outlet locations 16 spaced around the grain pile 10. At decision block 32, a determination is made as to whether an abnormal temperature variance or abnormal odor is detected at one or more of the aeration outlet locations 16. An abnormal temperature variance may be a rise in temperature, or any other abnormal temperature variance, such as an elevated temperature of one or more aeration outlet locations 16 with respect to other aeration outlet locations 16. For example, it is normal for outside air that is being drawn through the grain pile 10 to vary in temperature, such as from night to day. If air leaving one or more of the aeration outlet locations 16 fails to cool similarly to air leaving the other aeration outlet locations 16, this may be indicative of a problem. The presence of abnormal odors may be detected automatically, or may be detected by a person smelling the odors at or near one of the aeration outlet locations 16.

If no abnormal temperatures or odors are detected, execution loops back to step 30. If, however, an abnormal temperature or odor is detected at decision block 32, execution proceeds to step 34, where a determination is made of a problem location within the grain pile 10. The problem location is determined according to the locations of detected abnormal temperature variances or odors (e.g. at which aeration outlet locations abnormal temperatures or odors were detected), and the amount, magnitude, or value of the detected abnormalcy at each location where an abnormal temperature or odor was detected. In making the determination of the problem location, any previously-generated model of air flow through the grain pile 10 may be used, or a model of air flow may be generated at the time of determining a problem location.

Once a problem location has been determined, execution proceeds to step 36, where a determination is made as to how best to apply ozone to the problem location. This may involve determining available ozone insertion mechanisms and locations, and determining which ozone insertion mechanisms and locations will best ensure that an effective amount of ozone is delivered to the problem location. For example, depending on the problem location, it may be desirable to apply ozone at one of the aeration outlet locations 16, such as by reversing a direction of flow of air at the aeration outlet location 16. When the direction of flow is reversed, air is pushed or drawn into the grain pile 10 at the aeration outlet location 16, and any ozone that is mixed with the air will be forced or drawn into the grain pile 10. The direction of air flow may be reversed by simply turning off an outlet fan at the selected aeration outlet location, while the other outlet fans are left on. In other instances, an outlet fan may be reversed, but care should be taken that any covers of the pile remain in place and are not blown off by a reversed outlet fan.

As another example, ozone may be mixed with air at one or more of the open ends 20 of one or more aeration supply vents 18, where negative air pressure provided at the aeration outlet locations 16 will cause the ozone-air mixture at the open end 20 or open ends 20 to be drawn into the aeration supply vent 18 and from there into the grain pile 10. As still another example, very high concentrations of ozone can be directly applied to one or more locations of the grain pile 10 using an ozone delivery tube inserted into the grain pile 10, as will be discussed in more detail below. These examples may be combined and/or modified as necessary to treat a particular problem location, based on the problem location's size, position in the grain pile 10 (including position relative to the various structures associated with the grain pile 10 discussed herein), etc.

As part of the determination of how best to apply ozone to the problem location, a determination may be made as to whether application of ozone at an existing grain pile access point will allow the ozone to adequately reach and treat the problem location. Existing grain pile access points include the aeration outlet locations 16, the aeration supply vents 18, the center tower 24 (if any), and any other existing access points. If application of ozone at an existing access point will not permit the ozone to reach the problem location adequately, a new access point may be made by opening a hole in the covering 22 proximate the problem location. The new access point allows for the short-term application of very high concentrations of ozone at or proximate the problem location, after which the hole in the covering 22 may be re-closed to reduce unwanted moisture entry into the grain pile 10.

Once a determination is made as to how best to apply ozone to the problem location, execution proceeds to step 38, where ozone is applied to the problem location to minimize nascent problems in the grain pile 10. The ozone is applied in one or more fashions as best estimated or determined to apply or deliver an effective amount of ozone to the problem location. In some embodiments, ozone is supplied in the manner determined for a set time, the set time being calculated to address any cause or causes of the detected temperature variance or abnormal odor. Alternatively or additionally, in some embodiments, ozone is applied to the problem area until ozone is detected at (a) one or more of the aeration outlet locations 16 where the temperature variance or odor was detected, (b) one or more aeration outlet locations 16 adjacent the aeration outlet locations 16 where the temperature variance or odor was detected, or (c) at one or more aeration outlet locations 16 where the air flow model shows detection of ozone is indicative that an effective quantity of ozone has reached the problem location. Detection of ozone in this fashion is indicative that a certain effective quantity of ozone has been applied to the problem location.

Figure 6:
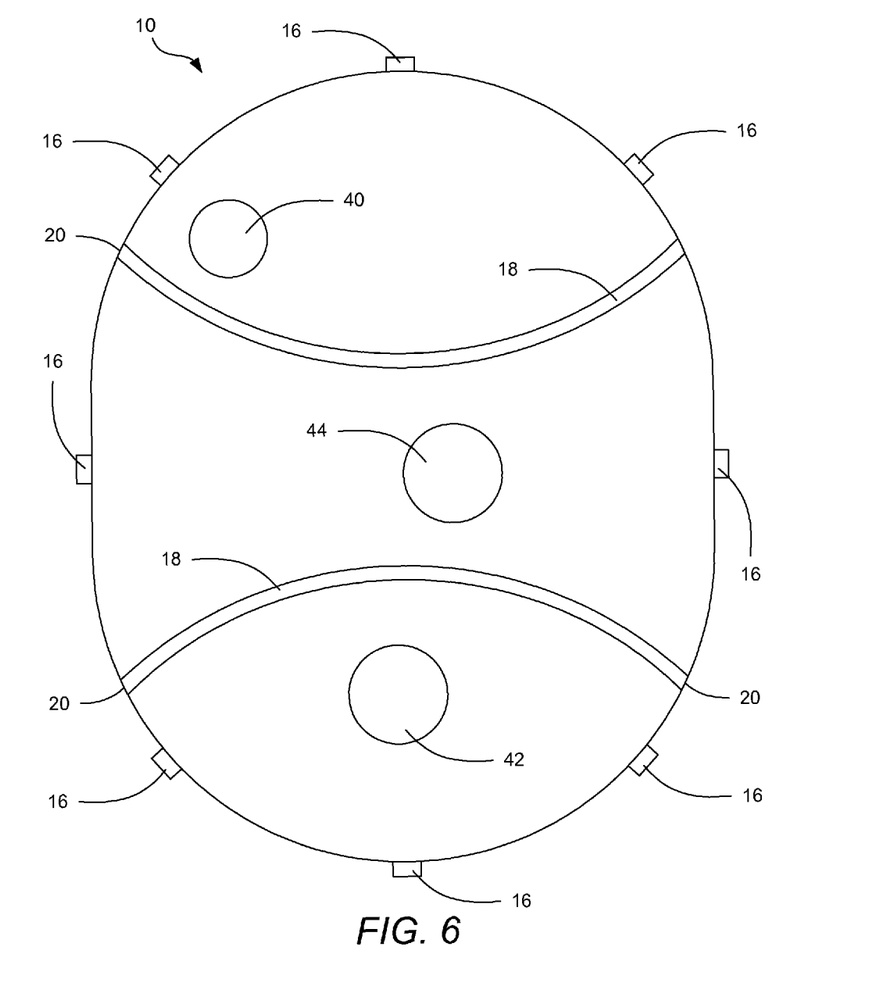
FIG. 6 shows a top diagrammatic view of a grain pile.

As an example, consider the top diagrammatic view of a simplified small grain pile 10 shown in FIG. 6. Illustrated in the Figures are three problem locations, a first problem location 40, a second problem location 42, and a third problem location 44. It should be understood that the three illustrated problem locations could exist and be detected individually, all together, or in some subset of the illustrated group. If the first problem location 40 were detected, it might be determined that a flow of air should be reversed at the aeration outlet location 16 closest to the first problem location 40 and that ozone should be applied to the reversed flow of air so as to reach the first problem location 40. Alternatively or additionally, it might be determined to apply ozone to the open end 20 of the aeration supply vent 20 closest to the first problem location 40. The manner or manners in which ozone should be applied may be determined based on the air flow model.

In the event the second problem location 44 were detected, it might be determined that the best treatment is achieved by applying ozone at both of the open ends 20 of the aeration supply vent 18 proximate the second problem location 44. Alternatively, the flow of air might be reversed on the more than one aeration outlet location 16 proximate the second problem location 42. The third problem location 44 is located at a spot where it may be more difficult to apply ozone to the third problem location 44 using an existing grain pile access point. Therefore, although it may be possible to apply ozone using the existing grain pile access points, it may be more efficient to apply high concentrations of ozone directly at the third problem location 44, such as by making an access hole in the covering 22 of the grain pile 10 and inserting one or more ozone delivery tubes into the grain 12 at or proximate the third problem location 44. Ozone can then be delivered directly to the third problem location through the ozone delivery tube or tubes, after which the ozone delivery tube or tubes can be withdrawn and the access hole in the covering 22 patched.

If and/or when air flow is reversed at one or more of the aeration outlet locations 16, the air flow model may be appropriately modified to take into account the changes in air flow caused by the reversal at the one or more aeration outlet locations 16. When ozone is applied at an aeration outlet location 16, it may be applied at a high concentration. It has been determined that for treating grain, it is better to treat at higher concentrations for shorter time periods than to treat for lower concentrations for longer time periods. Treatment using higher concentrations reduces problems caused by ozone-induced commercially-objectionable foreign odors (COFO). Thus, an ozone concentration may be at least eighty parts per million (ppm), and may optionally exceed one hundred fifty ppm, two hundred ppm, three hundred ppm, four hundred ppm, or five hundred ppm, as non-limiting examples only. Ozone generating equipment of sufficient ozone-generation capacity is used in all instances, and it may be appreciated that the ozone concentration will be dependent on the air flow and total quantity of ozone at any application point.

In the instances where ozone is applied to the open ends 20 of the aeration supply vents 20, it may be applied for a period of time that may be longer than that applied at the aeration outlet locations 16. Ozone applied to the open ends 20 may be applied for a set time period that may be on the order of approximately twelve to twenty-four hours. When ozone is applied using the ozone delivery tubes, it may be applied at much higher concentrations for short periods of time, with only minimal additional air flow through the ozone delivery tubes. Ozone injected in this way may exceed five thousand ppm and may even exceed ten thousand ppm. Currently, treatment has been performed with ozone concentrations reaching twelve thousand ppm or more.

The use of ozone as discussed herein may greatly increase the after-storage value of the grain 12 stored in the grain pile 10. Treatment with ozone while problems are small can greatly reduce or eliminate nascent problems in the grain pile 10 before the nascent problems spread and affect a greater proportion of the grain 12 to a greater amount. Methods according to the various embodiments of the invention improve upon methods of treatment that rely on application of low levels of ozone to the entire grain pile 10 for long periods of time in that only the areas needing treatment receive treatment, thus reducing the likelihood of ozone-induced COFO problems. The incidence of COFO problems is further reduced by embodiments of the invention in that relatively-high ozone concentrations are used for relatively-short time periods.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A method of treating a problem location of grain stored in a grain pile comprising:
   piling the grain outdoors, thus producing the grain pile;
   covering the grain pile with a covering;
   monitoring temperature and/or odor of the grain pile;
   upon detecting an abnormal temperature variance and/or an abnormal odor, determining the problem location in the grain pile;
   creating an access hole in the covering proximate the problem location;
   inserting a tube into the problem location of the grain pile through the access hole;
   applying ozone through the tube to the problem location within the grain pile; and
   removing the tube from the grain pile.

2. A method of treating grain as recited in claim 1, wherein the method reduces one of: mold; and toxin.

3. A method of treating grain as recited in claim 1, wherein a concentration of the ozone applied through the tube exceeds five thousand parts per million.

4. A method of treating grain as recited in claim 1, wherein a concentration of the ozone applied through the tube exceeds ten thousand parts per million.

5. The method of treating grain as recited in claim 1, further comprising patching the access hole.

6. The method of treating grain as recited in claim 1, further comprising monitoring temperature at a plurality of locations of the grain pile.

7. The method of treating grain as recited in claim 1, further comprising:
   placing a retaining structure and an aeration outlet where the grain pile is to be placed; and
   piling the grain within the retaining structure such that the aeration outlet is located with the grain.

8. The method of treating grain as recited in claim 7, further comprising forcing air into the grain pile through the aeration outlet.

9. The method of treating grain as recited in claim 7, further comprising drawing air out of the grain pile through the aeration outlet.

10. The method of treating grain as recited in claim 1, wherein the covering is a tarp or plastic.

11. A method of treating a problem location of grain stored in a grain pile comprising:
    monitoring temperature and/or odor of the grain pile;
    upon detecting an abnormal temperature variance and/or an abnormal odor, determining the problem location in the grain pile;
    inserting a tube into the problem location of the grain pile;
    applying ozone having a concentration of at least 5000 ppm through the tube to the problem location within the grain pile; and
    removing the tube from the problem location of the grain pile.

12. A method as recited in claim 11, further comprising:
   covering the grain pile with a covering;
   creating an access hole in the covering of the grain pile; and
   inserting the tube through the access hole.

13. The method of treating grain as recited in claim 12, further comprising patching the hole in the covering.

14. The method of claim 12, wherein the covering is a tarp or plastic.

15. A method of treating grain as recited in claim 11, further comprising piling the grain outdoors, thus producing the grain pile.

16. The method according to claim 11, further comprising:
   placing a vapor barrier on ground;
   placing a retaining structure on the ground; and
   placing the grain on the vapor barrier and within the retaining structure, thus producing the grain pile.

\* \* \* \* \*